Nov. 7, 1950        R. E. HUNT        2,529,396
TOOL SUPPORT
Filed Feb. 9, 1948
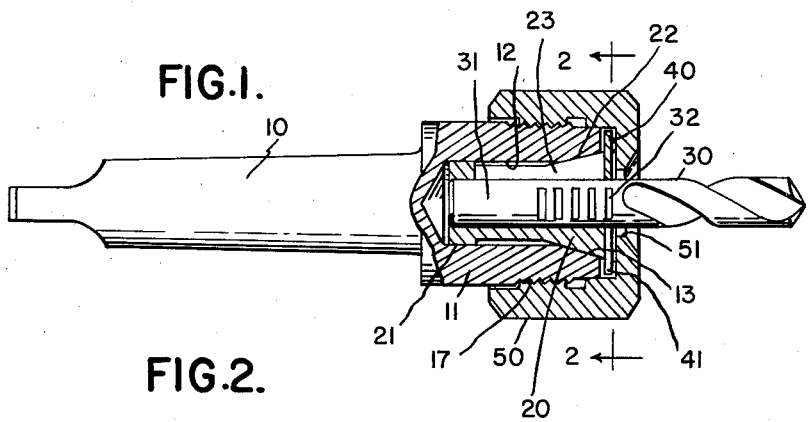
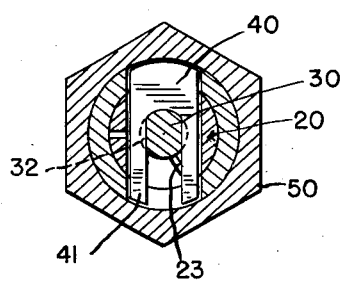
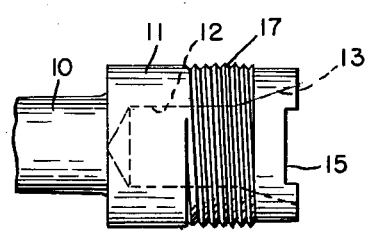
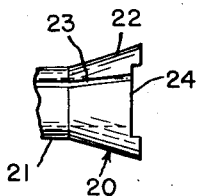
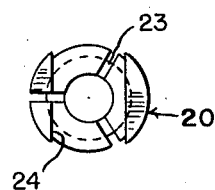
*INVENTOR.*
ROBERT E. HUNT
BY
ATTORNEYS Patented Nov. 7, 1950

2,529,396

UNITED STATES PATENT OFFICE 2,529,396

TOOL SUPPORT

Robert E. Hunt, Grosse Pointe Park, Mich.

Application February 9, 1948, Serial No. 7,184

6 Claims. (Cl. 279—52)

The present invention relates to a tool support and more particularly to means for supporting in various positions and driving a rotary tool.

It is an object of the present invention to provide a tool holder effective to support a rotary tool in a rigid manner so as to permit simultaneous use of a plurality of such tools on a work piece without the necessity of employing spaced tool guides such as have heretofore been fixed in a so-called bushing plate.

More specifically, it is an object of the present invention to provide a rotary tool holder comprising key means for supporting and driving the tool in different positions of axial adjustment.

It is a feature of the present invention to provide a rotary tool holder comprising an adapter containing a clamping collet for receiving the cylindrical shank of a tool in combination with key means extending transversely of the collet and adapter and shaped to enter recesses or notches formed in the shank of the tool.

Other objects and features of the invention will become apparent as the description proceeds, especially when taken in conjunction with the accompanying drawings, wherein:

Figure 1 is a side elevation of the improved tool support with parts broken away;

Figure 2 is a section on the line 2—2 of Figure 1;

Figure 3 is a fragmentary side elevation of the head portion of the adapter;

Figure 4 is a fragmentary side elevation of the clamping collet; and

Figure 5 is an end view of the clamping collet.

Referring now to the drawings, in Figure 1 there is shown a tool holder or support comprising an adapter 10 to be received in driving relation in a machine tool. The forward end of the adapter is provided with a laterally enlarged head 11 having an outwardly opening recess therein composed of a cylindrical portion 12 and a conical portion 13.

At its open end the head 11 is provided with a transverse keyway 15 whose purpose will later be described. In addition, the head 11 of the adapter is threaded as indicated at 17.

A split clamping collet 20 is provided to be received within the recess, the collet having a cylindrical portion 21 and a conical portion 22 adapted to engage the conical portion 13 of the recess. Means later to be described are provided for forcing the collet inwardly of the recess, which results in clamping pressure being applied thereto by the cooperating conical surfaces. This causes the collet to grip the shank of the tool in a well-known manner. The collet 20, as best seen in Figure 5, is provided with a plurality, and in this instance three, longitudinal slots 23 extending from its forward end to a point adjacent its rear end, these slots permitting clamping pressure to be applied to a tool supported therein. Extending transversely across the conical end of the collet is a transverse shallow keyway 24 whose width is preferably substantially equal to the width of the keyway 15 previously described.

As best seen in Figure 1, the structure is adapted to support a rotary tool which in this instance is illustrated as a drill 30. It will be understood, however, that the tool holder is adapted to support any desired type of rotary tool, such for example as an end mill, a counterboring tool or the like. The tool 30 is provided with a cylindrical shank 31 having a plurality of axially spaced opposed pairs of grooves or notches 32 formed therein. Means are provided for supporting the tool 30 against axial movement in the holder and also to drive the tool. This means takes the form of a driving plate or key 40 which is generally U-shaped and has a thickness slightly less than the depth of the keyway 15 formed in the end of the head 11 and the keyway 24 formed at the end of the collet 20. The key 40 is thus provided with a pair of arm portions 41 which are spaced apart by an amount which permits the key to be inserted into one of the pairs of opposed notches 32 provided in the shank of the tool 30.

In assembly the key 40 is inserted in the appropriate one of the pairs of notches or grooves 32 and the assembly of the tool and keyway is then inserted into the collet, the key 40 being seated in the aligned keyways 15 and 24. The adapter 10 is provided with a clamping nut 50 which is internally threaded to cooperate with the threads 17 formed on the head 11 and provided also with a central opening 51 through which the shank of the tool 30 extends. Adjacent the opening 51 the nut 50 is adapted to engage the ends of the collet so that as the nut is tightened on the adapter it drives the collet inwardly, thus bringing the conical surfaces 13 and 22 into coation and exerting clamping pressure on the shank of the tool. This clamping pressure, however, is not relied upon to retain the tool against axial movement or to drive the tool in rotation. Instead, these functions are carried out by the driving plate or key 40.

It will be apparent that the tool 30 may be supported in any one of a plurality of positions of axial adjustment according to the number of pairs of notches 32 provided. This permits controlling the amount by which the tool protrudes from the adapter and also permits the tool to be adjusted outwardly as it is ground back in resharpening.

While in the illustrated embodiment of the invention the tool holding and driving construction is shown as provided in an adapter, it will be obvious that it could equally well be provided at the end of a machine spindle.

The drawings and the foregoing specification constitute a description of the improved tool support in such full, clear, concise and exact terms as to enable any person skilled in the art to practice the invention, the scope of which is indicated by the appended claims.

What I claim as my invention is:

1. A holder for a rotary tool having a key-receiving notch in its shank, comprising a rotary member having a conical seat at its end and a keyway extending transversely across its end, a conical clamping collet in said seat, said collet having a keyway extending completely across its end and adapted to register with the keyway in the end of said member, a key seated in said keyways and adapted to enter the notch in the shank of the tool carried by said holder to transmit torque thereto and take up axial thrust thereon, and a clamping element engaging the end of said collet and shaped to retain said key in said keyways.

2. A holder for a rotary tool having a pair of opposed, key-receiving notches in its shank, comprising a rotary member having a conical seat at its end and a keyway extending transversely across its end, a conical clamping collet in said seat, said collet having a keyway extending completely across its end and adapted to register with the keyway in the end of said member, a U-shaped key seated in said keyways and adapted to enter the notches in the shank of the tool carried by said holder to transmit torque thereto and take up axial thrust thereon, and a clamping element engaging the end of said collet and shaped to retain said key in said keyways.

3. A holder for a rotary tool having a pair of opposed, key-receiving notches in its shank, comprising a rotary member having a conical seat at its end and a keyway extending transversely across its end, a conical clamping collet in said seat, said collet having a keyway extending completely across its end and adapted to register with the keyway in the end of said member, a U-shaped key seated in said keyways and adapted to enter the notches in the shank of the tool carried by said holder to transmit torque thereto and take up axial thrust thereon, said keyway being of a depth slightly greater than the thickness of said key, and a clamping element engaging the end of said collet and shaped to retain said key in said keyways.

4. In combination, a rotary tool having a shank provided with a plurality of axially spaced key-receiving notches, a holder therefor comprising a rotary member having a conical seat at its end and a keyway extending transversely across its end, a conical clamping collet in said seat, said collet having a keyway extending completely across its end and adapted to register with the keyway in the end of said member, a key seated in said keyways and adapted to enter one of the notches in the shank of the tool carried by said holder to transmit torque thereto and take up axial thrust thereon, and a clamping element engaging the end of said collet and shaped to retain said key in said keyways.

5. In combination, a rotary tool having a shank provided with a plurality of axially spaced pairs of opposed key-receiving notches, a holder therefor comprising a rotary member having a conical seat at its end and a keyway extending transversely across its end, a conical clamping collet in said seat, said collet having a keyway extending completely across its end and adapted to register with the keyway in the end of said member, a U-shaped key seated in said keyways and adapted to enter one of the pairs of notches in the shank of the tool carried by said holder to transmit torque thereto and take up axial thrust thereon, and a clamping element engaging the end of said collet and shaped to retain said key in said keyways.

6. A holder for a rotary tool having a key receiving notch in its shank, said holder comprising a collet having a transverse keyway and radially movable jaws, a key in said keyway and entering the notch in the tool shank to transmit driving torque and take up axial thrust, means for moving the jaws of said collet inwardly to grip the tool shank, and means for retaining said key in said keyway.

ROBERT E. HUNT.

REFERENCES CITED

The following references are of record in the file of this patent:

UNITED STATES PATENTS

| Number | Name | Date |
| --- | --- | --- |
| 1,197,204 | Hesse et al. | Sept. 5, 1916 |
| 2,182,411 | Rosenberg et al. | June 11, 1938 |

FOREIGN PATENTS

| Number | Country | Date |
| --- | --- | --- |
| 676,380 | Germany | Feb. 8, 1936 |